April 25, 1950 R. P. MEANS, JR 2,505,131
BALL NUT AND SCREW ASSEMBLY
Filed July 5, 1946

Inventor
Ralph P. Means, Jr.
By Blackmore, Spencer & Flint
Attorneys

UNITED STATES PATENT OFFICE 2,505,131

BALL NUT AND SCREW ASSEMBLY

Ralph P. Means, Jr., Saginaw, Mich., assignor to General Motors Corporation, Detroit, Mich., a corporation of Delaware Application July 5, 1946, Serial No. 681,545

5 Claims. (Cl. 74—459)

This invention relates to an improvement in ball bearing screw and nut gears of the type in which the screw and nut are provided with corresponding grooves forming a helical passage containing balls, which constitute the screw thread connection between the screw and nut, and especially to such a screw and nut gear in which a limited number of balls is recirculated through the helical passage by means of a transfer tube.

As explained in patent to Hawkins 2,267,524, December 23, 1941, and as shown in patent to Means, Jr., 2,380,662, July 31, 1945, it is quite desirable, in order to avoid friction, that the balls in the helical passage be divided into a plurality of separate and distinct trains or groups, the balls of each train being recirculated through its arcuate passage and the related transfer tube.

The object of this invention is to provide an improvement in such a type of screw and nut gear to facilitate the movement of the balls between the helical passages and the transfer tubes.

In the accompanying drawing:

Fig. 1 is a view in elevation of a screw and nut gear of the kind referred to.

Figure 1:
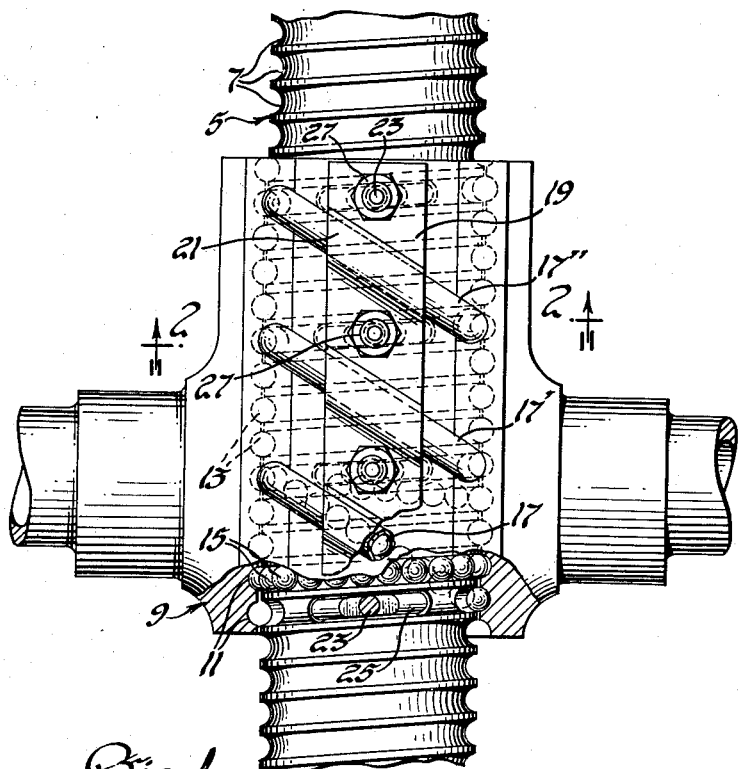
Figure 3:
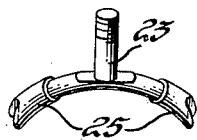
Fig. 3 is a perspective of a part used to facilitate the movement of the balls between the helical passage and the transfer tube.
Figure 2:
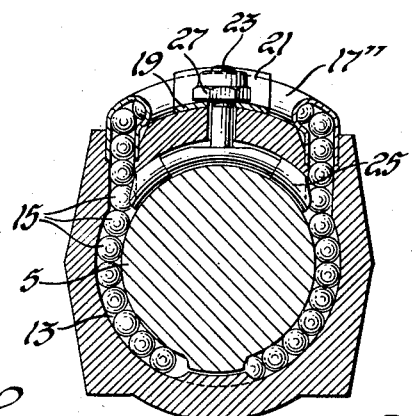
Fig. 2 is a section on line 2—2 of Fig. 1.

The invention is not to be restricted to any specific instrument. It will be found useful for steering gear; for lifting jacks and in other relations where such gearing has been or may be used.

In the drawing, the screw 5 is formed with a helical groove 7. The nut 9 has a similarly formed and cooperating groove 11. Grooves 7 and 11 form a helical passage 13 for balls 15.

The balls are shown divided into three groups, the balls of each group traveling through a predetermined helical passage and a transfer tube connecting the ends of said passage. For example, in Fig. 1, numerals 17, 17' and 17'' represent three transfer tubes associate each with an underlying helical passage and connecting the ends of said passage. A clamp 19 overlies the nut and has parts 21 embracing the transfer tubes. The clamp holds the transfer tubes in position being itself held by bolts 23 extending through the nut at points where the adjacent helical passages connect with their transfer tubes. These bolts have arcuate heads 25 located within the underlying helical passage and nuts 27 hold the assembly in position.

The bolts 23 with heads 25 are preferably made from steel and may more aptly be defined as deflectors since their ends occupy positions in the helical passage where the balls are either deflected by the heads into the transfer tubes or are deflected from the transfer tubes to traverse the helical passages. It will be seen from Fig. 1 that there are four of these deflectors, one at each end of the series of groups and one at each of the opposite ends of the intermediate group where it lies adjacent the inner end of one of the end groups. Of the outermost deflectors, one part of the head serves to deflect the balls to or from the arcuate passage depending upon the direction of rotation of the screw. Of the two head portions of the intermediate deflectors, one serves an end group of balls and the other serves one end of the intermediate group. It is believed that the operation of the device will be understood by any one skilled in the art and that no further description is needed.

I claim:

1. In screw and nut gearing, a screw, a nut, said screw and nut having cooperating grooves to form a helical passage, balls in said passage, said balls being divided into a plurality of groups, a transfer tube connecting the ends of each group, a deflector carried by said nut and having oppositely directed arcuate heads located in the central portion of said passage, one serving to deflect the balls of a first group to or from its transfer tube and the other of said deflectors to similarly serve another group.

2. The invention defined by claim 1, a clamp for said transfer tube, said deflector having a stem extending through said nut and clamp and means threaded on said stem whereby said deflector also serves to hold said transfer tube in position.

3. In screw and nut gearing, a screw, a nut, said screw and nut having cooperating grooves to form a helical passage, balls in said passage, said balls being divided into a plurality of groups, a substantially radial aperture in said nut, said aperture extending into a groove between a pair of said ball groups, a deflector having a bolt portion in said aperture and two oppositely directed arcuate head portions located in said passage, one head portion serving to deflect the balls of a first group to or from the helical passage and the other head portion of said deflector similarly serving another group, bores in said nut at the end of said heads to provide a portion of the return passage, a transfer tube connecting said bores and lying on the outer surface of said nut to complete the return passage, a clamp positioned over said transfer tube, said clamp being apertured to receive said bolt portion of said deflector, securing means fastened to said bolt portion and securing said transfer tube and deflector to said nut.

4. In screw and nut gearing, a screw, a nut, said screw and nut having cooperating grooves to form a helical passage, a transfer conduit connecting the ends of said passage, an arcuate deflector in said passage adjacent the junction of an end of the conduit with an end of the passage, an aperture through the side wall of said nut to said passage portion containing said arcuate deflector, said deflector having a stem extending through said aperture in the nut and means outside of the nut associated with said stem to hold the deflector in position.

5. In screw and nut gearing, a screw, a nut, said screw and nut having cooperating grooves to form a helical passage, a transfer tube connecting the ends of said passage, an arcuate deflector in said passage adjacent the juncture of an end of the tube with an end of the passage, an aperture through the side wall of said nut to said passage portion containing said arcuate deflector, said deflector having a stem extending through said aperture in the nut, a clamp positioned over said tube, securing means on said stem holding said clamp and tube on the nut and drawing said arcuate deflector against the interior groove of the nut.

RALPH P. MEANS, Jr.

REFERENCES CITED

The following references are of record in the file of this patent:

UNITED STATES PATENTS

| Number | Name | Date |
|---|---|---|
| 1,831,080 | Schmidt | Nov. 10, 1931 |
| 2,322,000 | Douglas | June 15, 1943 |
| 2,380,662 | Means | July 31, 1945 |

FOREIGN PATENTS

| Number | Country | Date |
|---|---|---|
| 30,214 | Great Britain | Dec. 24, 1909 |
| 559,407 | Great Britain | Feb. 17, 1944 |
| 487,331 | France | June 25, 1918 |